O. D. WASHBURN.
STRAPPING MACHINE.
APPLICATION FILED MAR. 10, 1917.
1,228,856. Patented June 5, 1917.
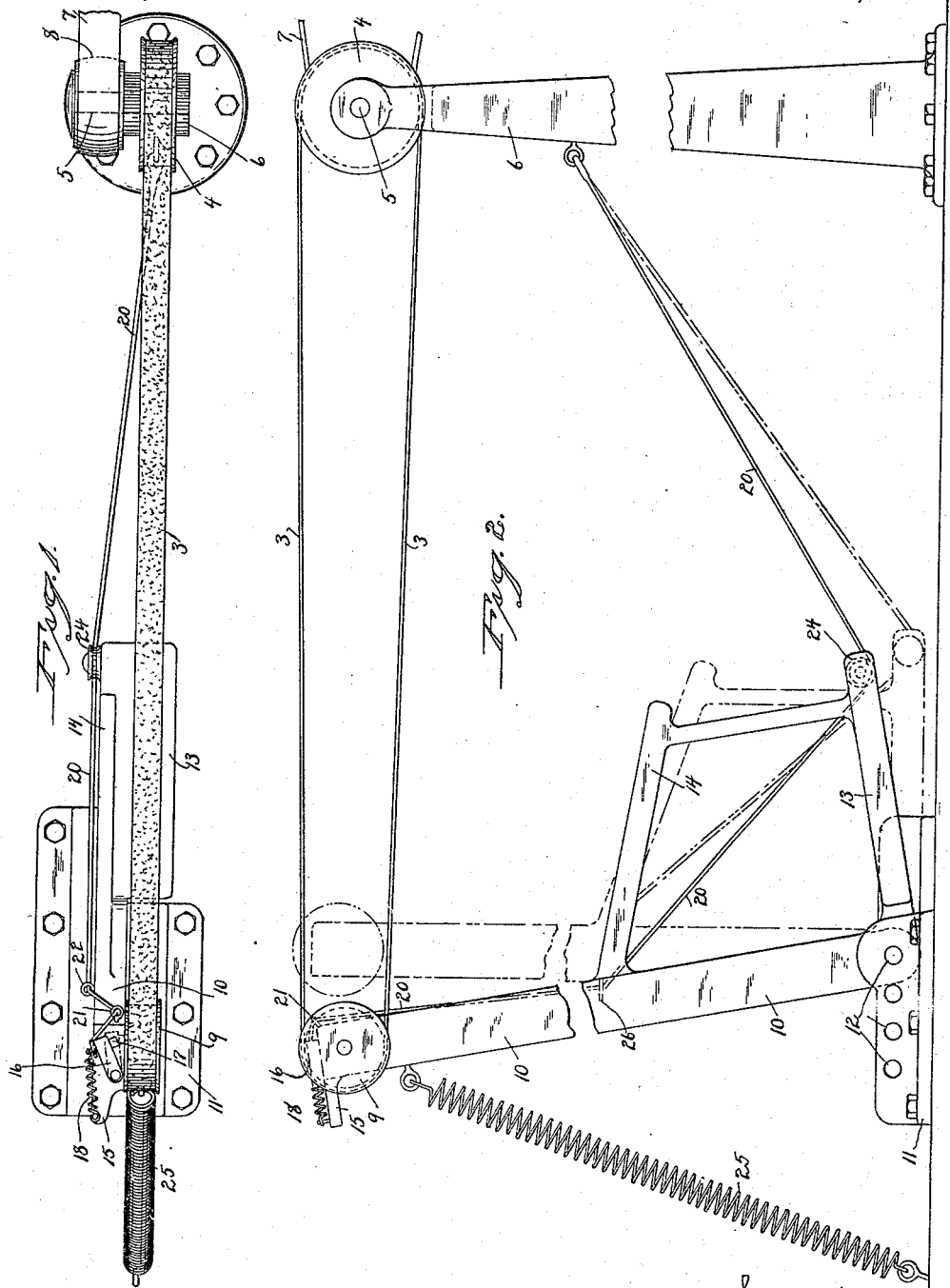

UNITED STATES PATENT OFFICE.

OLIVER D. WASHBURN, OF WHITNEYVILLE, CONNECTICUT.

STRAPPING-MACHINE.

1,228,856.　　　　Specification of Letters Patent.　　Patented June 5, 1917.

Application filed March 10, 1917. Serial No. 154,055.

*To all whom it may concern:*

Be it known that I, OLIVER D. WASHBURN, a citizen of the United States, residing at Whitneyville, in the county of New Haven and State of Connecticut, have invented a new and useful Improvement in Strapping-Machines; and I do hereby declare the following, when taken in connection with the accompanying drawings and the characters of reference marked thereon, to be a full, clear, and exact description of the same, and which said drawings constitute part of this application, and represent, in—

Figure 1 a top or plan view of a strapping machine constructed in accordance with my invention.

Fig. 2 a side view of the same.

This invention relates to an improvement in strapping machines, that is a frame on which a belt or strap is carried and used in finishing the surfaces of metal articles. These belts run over a driven pulley and over an idler, from which idler the belt is removed when work is placed on the belt, or removed therefrom.

The object of this invention is to mount the idler pulley at the upper end of a pivotal lever which may be moved by the foot so as to release tension upon the belt and at the same time apply a brake to the idler pulley to prevent its rotation so that the belt may be removed and replaced on the idler without stopping the driving mechanism and without danger to the operator; and the invention consists in the construction hereinafter described and particularly recited in the claims.

In carrying out my invention I employ the usual polishing belt 3 which runs over a driven pulley 4 on a shaft 5 at the upper end of a standard 6, the shaft being driven by a belt 7 running over a pulley 8 fixed to the shaft 5, or the pulley 4 may be driven in any other desired way. The belt 3 also runs over an idler 9 mounted at the upper end of a lever 10 pivotally connected with a base 11 adapted to be secured to the floor. Preferably and as shown, this base is provided with a series of holes 12 with either of which the lower end of the lever 10 may be engaged. This lever is provided with a foot-treadle 13 suitably connected with the lever 10 by a brace 14. Mounted on the head 15 at the upper end of the lever and on the side opposite the idler 9, is a horizontal brake 16 having a bearing point 17 adapted to be moved against one side of the idler 9. This brake is normally drawn out of contact with the idler by a spring 18, and is moved into contact by means of a cord 20 extending from the brake through guides 21 and 22, beneath a roller 24 at the upper end of the foot-treadle 13 and into engagement with the standard 6. The lever 10 is moved away from the standard 6 by a spring 25 which places the proper tension on the belt 3. While the belt is moving a downward pressure on the foot-treadle 13 moves the lever 10 forward so as to relieve tension on the belt and allow it to be freely slipped off from the idler 9. At the same time this downward movement of the treadle imposes a draft upon the cord 20 so as to move the brake 16 and force the bearing point 17 against the end of the idler 9 and so as to arrest its movement. After the work has been removed from the belt and another piece passed over the belt, the belt is replaced over the idler 9 and pressure on the foot-treadle released, allowing the lever 10 to swing backward under the tension of the spring 25 and again tighten the belt 3 so that it will move under the action of the driving wheel 4.

This construction providing for the release of tension by the foot, leaves both hands of the operator free to manipulate the belt and the placing and removal of the work, and avoids any possible danger to the operator through the movement of the idler during the removal or replacing of the belt.

I claim:—

1. A strapping machine comprising a driven pulley, a tensioned pivotal lever, an idler carried by said lever, a belt extending over the driven pulley and idler, and a foot-treadle connected with the lever adapted to move the same and a brake adapted to be applied to said idler.

2. A strapping machine comprising a driven pulley, a spring-tensioned pivotally mounted lever, an idler carried by the upper end of said lever, a belt extending over the driven pulley and idler, a horizontally movable brake connected with the upper end of said lever adjacent to one end of the idler, a spring normally tending to retire the brake, a foot-treadle connected with the lever, and flexible connection extending from the brake under the foot-treadle to a fixed point, whereby when the treadle is depressed, the lever will be moved forward to release tension on the belt and the brake will be applied to arrest the movement of the idler.

In testimony whereof, I have signed this specification in the presence of two subscribing witnesses.

OLIVER D. WASHBURN.

Witnesses:
FREDERIC C. EARLE,
C. L. WEED.

Copies of this patent may be obtained for five cents each, by addressing the "Commissioner of Patents, Washington, D. C."